(12) United States Patent
Frea (10) Patent No.: US 12,516,974 B2
(45) Date of Patent: Jan. 6, 2026

(54) SYSTEM FOR ESTIMATING A LOAD INDEX OF A RAILWAY VEHICLE

(71) Applicant: FAIVELEY TRANSPORT ITALIA S.P.A., Piossasco (IT)

(72) Inventor: Matteo Frea, Cantalupa (IT)

(73) Assignee: Faiveley Transport Italia, S.P.A., Turin (IT)

( * ) Notice: Subject to any disclaimer, the term of this patent is extended or adjusted under 35 U.S.C. 154(b) by 589 days.

(21) Appl. No.: 17/759,909

(22) PCT Filed: Feb. 5, 2021

(86) PCT No.: PCT/IB2021/050942
§ 371 (c)(1),
(2) Date: Aug. 1, 2022

(87) PCT Pub. No.: WO2021/156806
PCT Pub. Date: Aug. 12, 2021

(65) Prior Publication Data
US 2023/0122725 A1    Apr. 20, 2023

(30) Foreign Application Priority Data
Feb. 6, 2020    (IT) .......... 102020000002329

(51) Int. Cl.
*G01G 19/04*    (2006.01)
*G06T 7/62*    (2017.01)
*G06V 10/74*    (2022.01)
(52) U.S. Cl.
CPC .............. *G01G 19/04* (2013.01); *G06T 7/62* (2017.01); *G06V 10/761* (2022.01); *G06T 2207/30242* (2013.01)

(58) Field of Classification Search
CPC .. G01G 19/04; G06T 7/62; G06T 7/11; G06T 10/772; G06T 2207/30242; G06V 10/761; G06V 2201/06; G06Q 50/40
(Continued)

(56) References Cited

U.S. PATENT DOCUMENTS 6,856,344 B2 *    2/2005    Franz ................. G01N 21/8806
                                                                       348/143
6,871,137 B2 *    3/2005    Scaer ..................... G08G 1/202
                                                                       709/219
(Continued)

FOREIGN PATENT DOCUMENTS

JP    2018148367 A    9/2018
JP    20196272 A    1/2019
(Continued)

OTHER PUBLICATIONS

ISA European Patent Office, International Search Report Issued in Application No. PCT/IB2021/050942, May 21, 2021, WIPO, 2 pages.

*Primary Examiner* — Jacques M Saint Surin
(74) *Attorney, Agent, or Firm* — K&L Gates LLP (57) ABSTRACT

A system for estimating a load index of a railway vehicle is described, comprising:
an image acquisition means arranged to acquire a real-time image of a predetermined area inside a wagon of such a railway vehicle; and
a control means arranged to determine the load index of the railway vehicle as a function of this image acquired by the image acquisition means.

14 Claims, 6 Drawing Sheets

(58) Field of Classification Search
USPC .......................................................... 177/163
See application file for complete search history.

(56) References Cited

U.S. PATENT DOCUMENTS

| | | | |
|---|---|---|---|
| 8,565,913 B2* | 10/2013 | Emanuel | B66F 9/0755 |
| | | | 700/229 |
| 8,655,540 B2* | 2/2014 | Mian | B61L 27/57 |
| | | | 701/19 |
| 10,081,376 B2* | 9/2018 | Singh | B61L 23/048 |
| 10,518,791 B2* | 12/2019 | Singh | G06F 18/251 |
| 10,740,652 B2 | 8/2020 | Bamba | |
| 10,752,271 B2* | 8/2020 | Chung | B61L 15/0027 |
| 2015/0278617 A1 | 10/2015 | Oami | |
| 2020/0023811 A1 | 1/2020 | Herman et al. | |
| 2023/0122725 A1 | 4/2023 | Frea | |

FOREIGN PATENT DOCUMENTS

| | | |
|---|---|---|
| JP | 2019022306 A | 2/2019 |
| JP | 2020196349 A | 12/2020 |
| JP | 7650284 | 3/2025 |
| WO | 2013088620 A1 | 6/2013 |
| WO | 2016139203 A1 | 9/2016 |
| WO | 201912730 A1 | 1/2019 |
| WO | 2021156806 A1 | 8/2021 |

\* cited by examiner

| Load condition | Load index | Pressure of the suspension(s) [bar] |
|---|---|---|
| AW0 (tare) | 0 | P0 |
| AW2 (normal load) | 0,5 | P2 |
| AW3 (full load) | 1 | P3 |

SYSTEM FOR ESTIMATING A LOAD INDEX OF A RAILWAY VEHICLE

CROSS REFERENCE TO RELATED APPLICATIONS

The present application is a U.S. National Phase of International Application No. PCT/IB2021/050942 entitled "SYSTEM FOR ESTIMATING A LOAD INDEX OF A RAILWAY VEHICLE," and filed on Feb. 5, 2021. International Application No. PCT/IB2021/050942 claims priority to Italian Patent Application No. 102020000002329 entitled "SYSTEM FOR ESTIMATING A LOAD INDEX OF A RAILWAY VEHICLE," filed on Feb. 6, 2020. The entire contents of each of the above-listed applications are hereby incorporated by reference for all purposes.

TECHNICAL FIELD

This invention relates, in general, to the railway vehicle sector; in particular, the invention refers to a system for estimating a load index of a railway vehicle.

DISCUSSION OF ART AND BRIEF DESCRIPTION

Trains are sized to have a minimum tare mass, AW0, and a maximum full load mass, AW3. Typically, intermediate load values are also defined, such as, for example, the nominal load, AW2.

Obviously, what has just been explained may apply to the loading of passengers and/or the loading of freight. Nominal values of tare mass M0, nominal mass M2 and full load mass M3 are typically defined and known at the design level and, subsequently, downstream of a direct weight measurement.

The dynamic information of the vehicle mass, in any operating load condition between tare and full load, is needed to control the braking of the vehicle. This applies to both service braking and emergency braking, whichever the brake actuation technologies are, for example by means of pad-disc, shoe brake, electrodynamic brake, magnetic brake, e.g., MTB, Eddy current brake, etc.

The braking force to be applied to obtain a certain target deceleration is:

$$\text{Braking Force} = \text{Target Deceleration} * \text{Vehicle Mass}. \quad (1)$$

Since the tare and full load mass values are known, the problem of measuring the vehicle mass translates into a problem of measuring a load index of said vehicle:

$$\text{Vehicle mass} = \text{Tare mass} + \text{Load Index} * (\text{full load mass} - \text{tare mass}). \quad (2)$$

Figure 1:
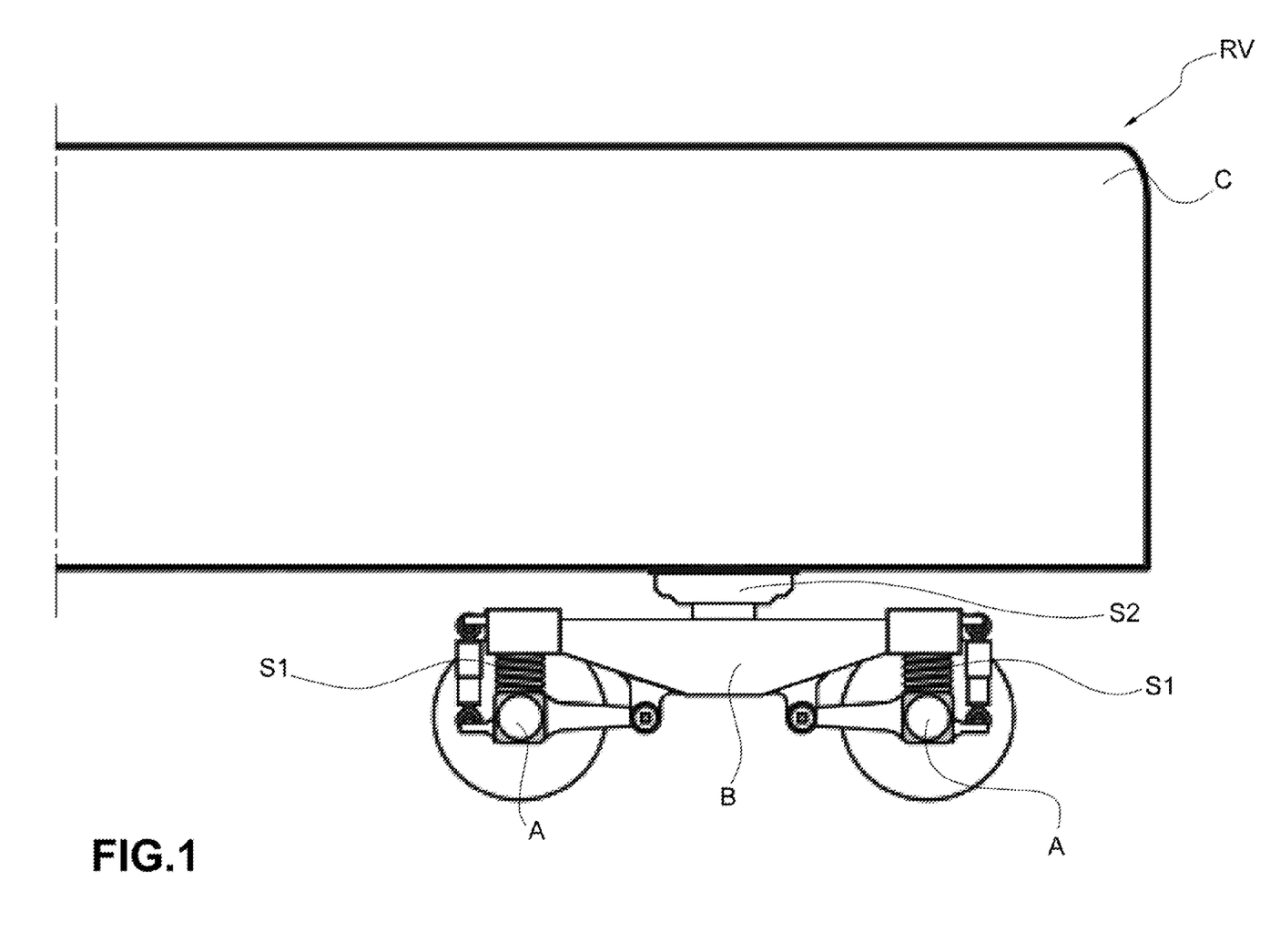
FIG. 1 illustrates an example of a known railway vehicle equipped with suspensions.

As may be seen in FIG. 1, railway vehicles RV are normally equipped with suspensions:
Primary suspension S1: between the axle A and the bogie B;
Secondary suspension S2: between the bogie B and the carbody C.

Among the main objectives for the suspensions are the following:
reducing vibrations transferred between the rail, the axle and the body;
improving passenger comfort inside the railway vehicle;
reducing the mechanical stresses to which the rolling stock is subjected;
leveling the carbody relative to the platform;
improving comfort and safety for passengers getting on and off.

The primary suspensions are mechanical and are constructed using springs.

Secondary suspensions are typically pneumatic but may also be mechanical.

In the case of pneumatic suspensions, they are based on air springs, air bellows, and leveling valves.

The leveling valve has the function of loading, unloading, or maintaining the pressure inside the pneumatic suspension in order to ensure a certain height (level) of the suspended part of the railway vehicle, i.e., of the carbody.

The level to be maintained is typically the one that aligns the floor of the carbody with the platform.

Figure 2:
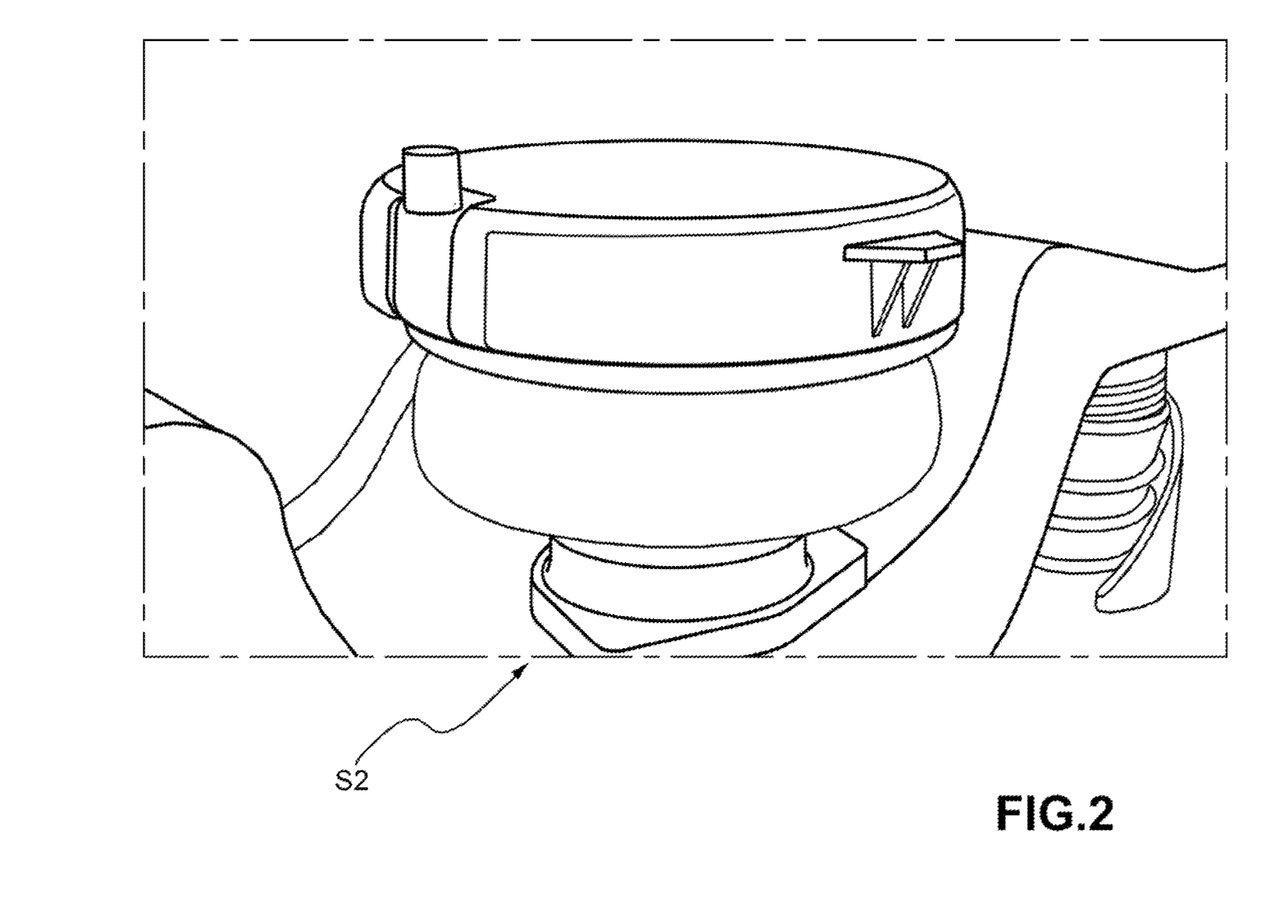
FIG. 2 illustrates an example of pneumatic suspension.

FIG. 2 shows an example of a pneumatic suspension, which may be used as a secondary suspension S2.

The pressure that the leveling valve must control inside the suspension is dependent on the suspended mass of the railway vehicle. For example, if the suspended load increases, the pressure necessary to keep the carbody at a certain height increases.

The pneumatic secondary suspensions, and in particular the pressure measured inside of them, are therefore an indirect measurement of the load percentage of the vehicle.

Assuming a vehicle consisting of two bogies and four axles, since the pneumatic secondary suspensions are mounted at bogie level, it is possible to determine the load percentage of the single bogie. In the event wherein the braking force is managed at the bogie level, i.e., separate braking force for the axles of the first bogie (bogie 1) and the axles of the second bogie (bogie 2), this will result in:

$$\text{Bogie 1 Braking Force} = \text{Target Deceleration} * \text{Bogie 1 Mass} \quad (3)$$

$$\text{Bogie 2 Braking Force} = \text{Target Deceleration} * \text{Bogie 2 Mass} \quad (4)$$

In the event that braking is managed at the vehicle level, i.e., the same braking force is applied to all vehicle axles, the load index of the vehicle will be calculated from the load index of each bogie according to a methodology that depends on the application, which may be, for example:

$$\text{load index} = (\text{bogie 1 load index} + \text{bogie 2 load index})/2 \quad (5)$$

or $$\text{load index} = \max(\text{bogie 1 load index}, \text{bogie 2 load index}) \quad (6)$$

or $$\text{Load index} = \min(\text{bogie 1 load index}, \text{bogie 2 load index}) \quad (7)$$

Once the load index of the vehicle has been determined, its mass may be determined by applying the formula (2) above, and the braking force may be determined by applying the formula (1) above.

Figure 3:
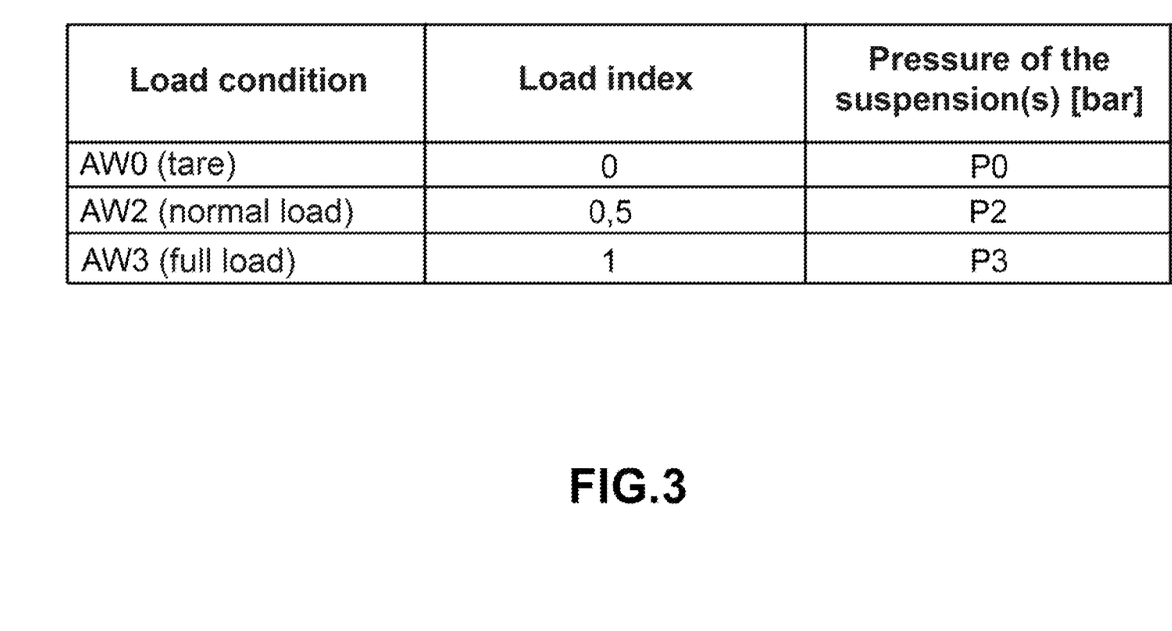
FIG. 3 is an exemplifying table which reports load index data in relation to the pressure of the suspensions.

The association between the pressure values of the suspensions and the load indices is defined in the design phase and subsequently refined through an empirical calibration based on direct weighing of the vehicle under known load conditions. This calibration is done on a vehicle (used as a sample) of a certain family of vehicles. Downstream of this calibration, for example, a table of the type illustrated in FIG. 3 is obtained.

Figure 4:
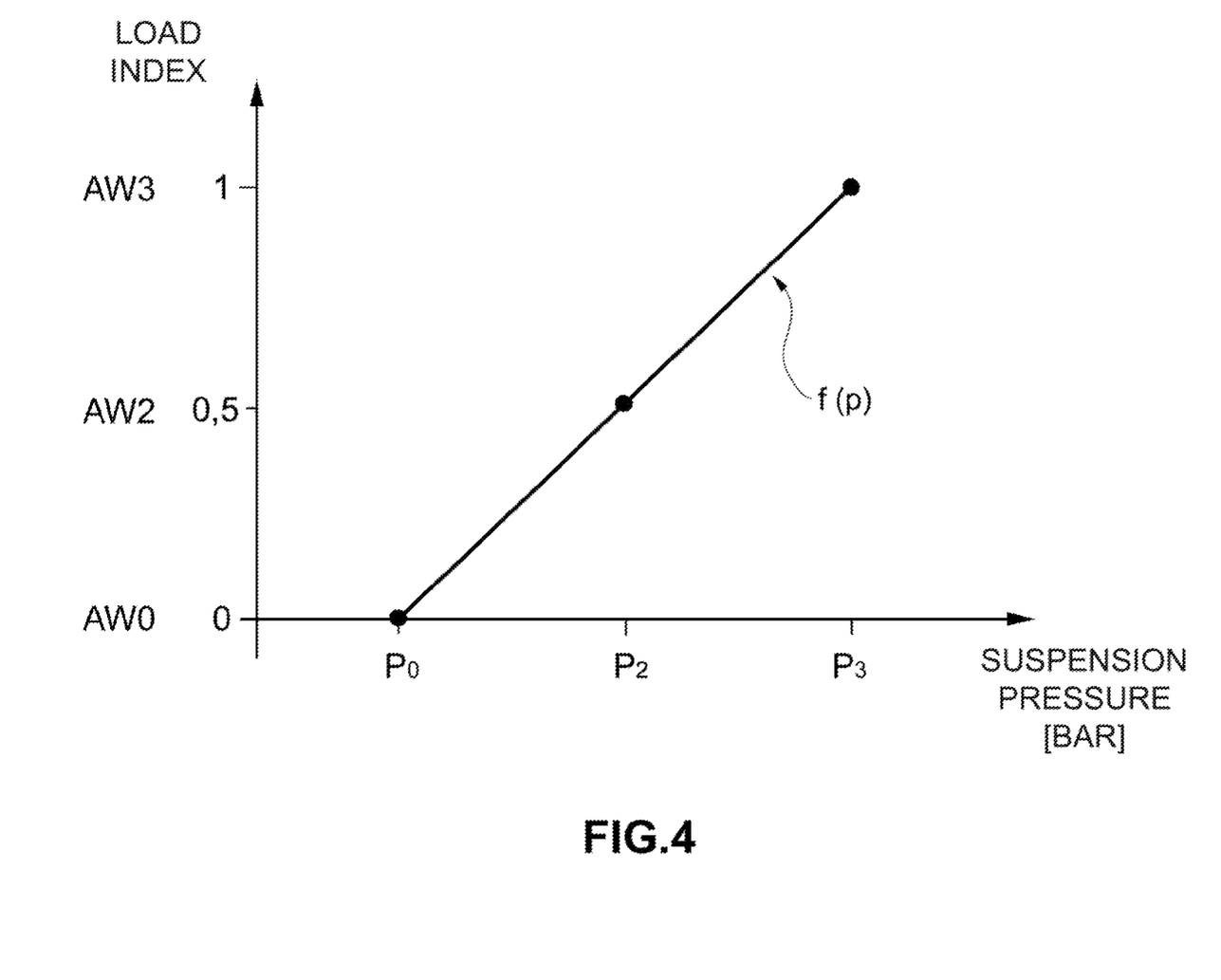
FIG. 4 illustrates a characteristic function which associates the pressure of the suspensions with the load index.

Once this table has been obtained, it is possible to construct a characteristic function $f(p)$ which associates the pressure of the suspensions with the load index, as illustrated in FIG. 4.

Figure 5:
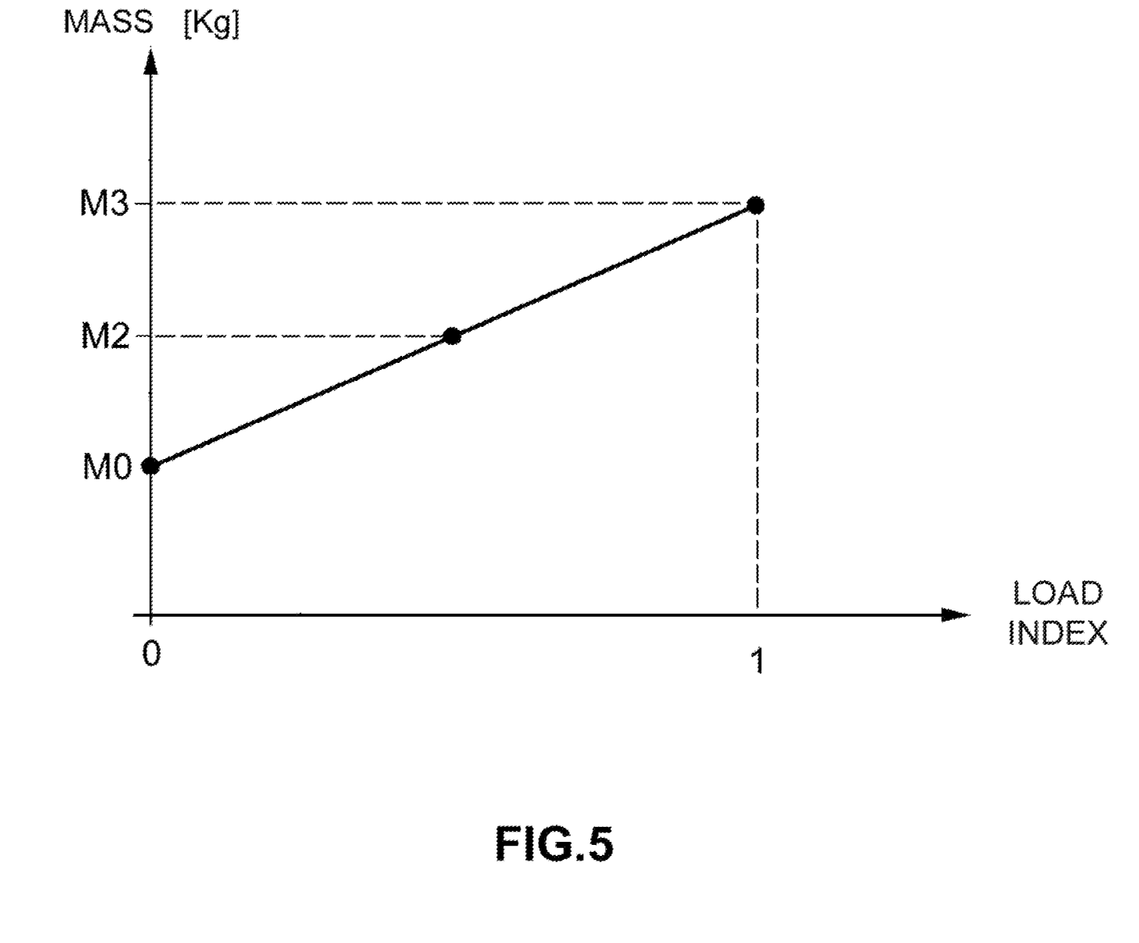
FIG. 5 is a graph illustrating the trend of the vehicle mass as a function of the load index.

Once the load index has been determined from the pressure at the suspensions, the mass of the vehicle may be easily deduced using the formula (2). A graph illustrating the trend of the vehicle mass as a function of the load index is shown in FIG. 5.

Systems made according to the prior art have the drawbacks described below:

a) energy drawback: pneumatic suspensions consume compressed air, which is generated by compressors that are heavy, consume energy, are hot, and are noisy;

b) the oscillations, typical of the running dynamics of a train, cause the leveling valves to modulate the pressure at the suspensions even if the vehicle load is constant; such modulations are unnecessary for comfort purposes and unduly consume air, having a further impact on the energy drawback.

To overcome the drawback b), the leveling valves work with a deadband, i.e., the pressure is not modulated if the variations in height (level) of the carbody remain within a certain tolerance band. This solution reduces the undue consumption of air but causes an imprecision in maintaining the height of the carbody relative to the ground and an indirect imprecision in the measurement of the mass from the pressure at the suspensions.

The indirect measurement of weight through suspension pressure also suffers from an inherent imprecision in the technology. As the pressure changes, the shape of the suspension changes and therefore the contact surface changes. The lifting force exerted by the suspension is:

Lifting force=surface*pressure

Since the surface is pressure-dependent, the force-pressure relationship is non-linear. Thus, the characteristic function of FIG. 4 is not a straight line. To determine this characteristic, an accurate empirical calibration would be necessary; the measurements shown in table 1 should be many in order to have many points in the graph in FIG. 4. Typically, in reality, the characteristic of FIG. 4 is assumed to be linear between P0->P3 and AW0->AW3, causing further inaccuracy in the measurement of the vehicle mass.

In order to solve the drawbacks described above, and with a more general view of making the rolling stock lighter (removal of compressors, pipes, etc.), a possible scenario of trains without compressed air is envisaged. Some manufacturers are moving towards the use of non-pneumatic secondary suspensions, replacing them, for example, with passive mechanical suspensions. In this scenario, the measurement of the vehicle mass may no longer be based on the measurement of the pressure of the pneumatic suspensions, as they are no longer present.

This patent application proposes an alternative system for determining the load index of the railway vehicle, and therefore its mass, which is based on at least one image acquisition means, such as for example at least one camera and/or video camera and/or telecamera and/or presence sensor placed inside the vehicle, with adequate image processing/artificial intelligence/deep learning algorithms.

This solution may be used for measuring the vehicle mass even in the absence of pneumatic suspensions or as an alternative to known systems in trains equipped with pneumatic suspensions. However, this solution is advantageous in terms of energy, costs and accuracy relative to the known solutions.

The aforesaid and other objects and advantages are achieved, according to an aspect of the invention, by a system for estimating a load index of a railway vehicle having the features defined in claim 1. Preferred embodiments of the invention are defined in the dependent claims, the content of which is to be understood as an integral part of this description.

BRIEF DESCRIPTION OF THE DRAWINGS

The functional and structural features of some preferred embodiments of a system for estimating a load index for a railway vehicle according to the invention will now be described. Reference is made to the appended drawings, wherein.

DETAILED DESCRIPTION

Before describing a plurality of embodiments of the invention in detail, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

Figure 6:
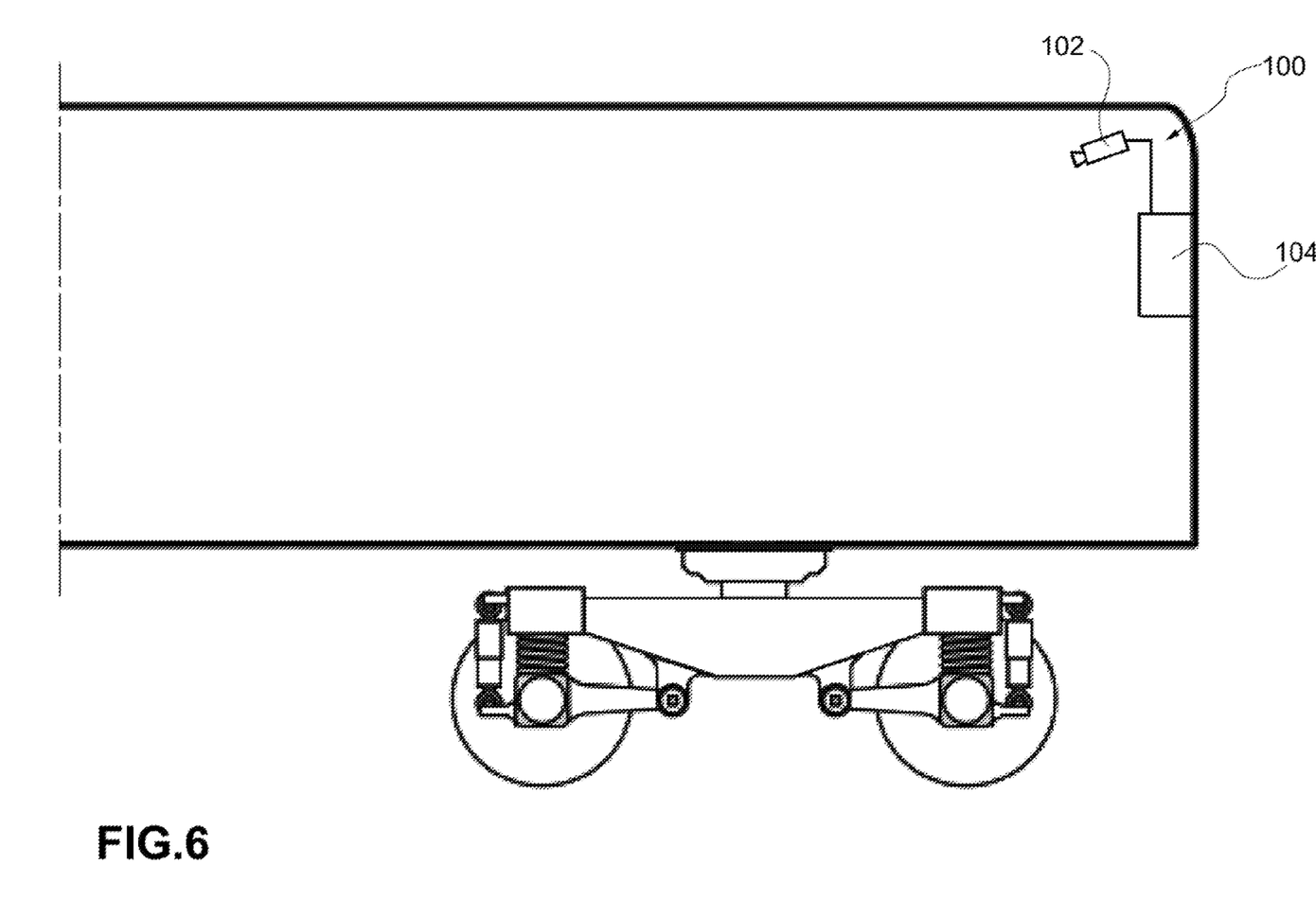
FIG. 6 illustrates a first embodiment of a system for estimating a load index of a railway vehicle according to this invention.

Referring initially FIG. 6, a system for estimating a load index of a railway vehicle 100 according to the invention comprises an image acquisition means 102 arranged to acquire a real-time image of a predetermined area of the interior of a railway vehicle wagon. Furthermore, the system for estimating a load index of a railway vehicle also comprises a control means 104 arranged to determine the load index of the railway vehicle from the image acquired by the image acquisition means 102.

For example, the image acquisition means 102 may be at least one camera and/or video camera and/or telecamera and/or presence sensor. Obviously, the acquisition means may also be more than one, so as to improve the accuracy of the estimate made by the system for estimating a load index of a railway vehicle.

For example, the control means 104 may be a control unit, an FPGA, a PLC, a microprocessor, a processor, a controller or a control unit, etc.

Obviously, that which is explained in this description referring to the load index may be applied similarly to a load percentage, multiplying this load index by one hundred. For example, a load index of 0.8 will correspond to a load percentage of 80%.

In one embodiment, the control means may be arranged to compare the image acquired by the image acquisition means 102 with a plurality of predefined sample images. A predetermined railway vehicle load index will then be assigned to each sample image.

In light of the comparison carried out, the control means may be set up to determine which sample image has the greatest degree of similarity with the image acquired by the image acquisition means 102.

Lastly, once the sample image having the greatest degree of similarity with the image acquired by the image acquisition means 102 has been determined, the control means 104 may be arranged to determine that the current load index of the railway vehicle corresponds with the predetermined load index assigned to the sample image determined to have the greatest degree of similarity to the image acquired by the image acquisition means 102.

The degree of similarity may be determined as a function of one or more predetermined evaluation parameters, such as, for example, but not exclusively, chromatic evaluation parameters, shape parameters, brightness parameters.

The general idea may be to extract the characteristics (i.e., the aforesaid evaluation parameters that describe the image as accurately as possible), arrange them in a vector form, and then perform a comparison between these vectors.

For example, CBIR (Content Based Image Retrieval) techniques, techniques based on PCA (Principal Component Analysis), Wavelet Transformer, and others may be used.

Taking a practical example, a first sample image may be an image acquired in a load index condition equal to 1, a second sample image may be an image acquired in a load index condition equal to 0.5, and a third image sample may be an image acquired in a load index condition equal to 0. Thus, the first sample image will be assigned the load index 1, the second sample image will be assigned the load index 0.5, and the third sample image will be assigned the load index 0.

Subsequently, a current image will be acquired by the imaging means 102. This current image will be compared with the three sample images. If the first sample image is most like the current image, it will be determined that the load index of the railway vehicle in the acquired image will be that of the first sample image, i.e., 1. If the second sample image is most like the current image, it will be determined that the load index of the railway vehicle in the acquired image will be that of the second sample image, i.e., 0.5. If the third sample image is most like the current image, it will be determined that the load index of the railway vehicle in the acquired image will be that of the third sample image, i.e., 0.

The control means 104 may be arranged to determine which sample image has the greatest degree of similarity with the image acquired by the image acquisition means 102 through an image recognition software based on artificial intelligence.

In a further embodiment, the control means 104 may be arranged to count the number of passengers in the image acquired by the image acquisition means 102.

Once the number of passengers has been counted, the control means 104 may be arranged to determine the current load index of the railway vehicle, as a function of a predetermined value of the average weight of a passenger, the number of passengers counted, a value of full load mass indicative of the mass of the railway vehicle in a condition wherein there is the maximum acceptable number of passengers present and a tare mass value indicative of the mass of the railway vehicle in a condition wherein there are no passengers present. The following formula may be used to determine the current load index of the railway vehicle:

$$\text{load index} = \frac{\text{number of passengers counted} * \text{average passenger weight}}{\text{full load mass} - \text{tare mass}}$$

The maximum acceptable number of passengers may be understood as the number of people who may be accommodated inside the railway vehicle according to the appropriate regulations.

In a practical example, if the number of passengers counted is 10, the average weight is 70 kg, the full load weight is 1000 kg and the tare mass weight is 100 kg, the load index will be:

$$\text{load index} = \frac{10 * 70}{1000 - 100} = 0.78$$

In a further alternative embodiment in which a railway vehicle for freight transport and not for passenger transport is considered, the control means 104 may be arranged to count the number of freight items in the image acquired by the image acquisition means 102.

Once the number of freight items has been counted, the control means 104 may be arranged to determine the current load index of the railway vehicle, as a function of a predetermined value of the average weight of a freight item, the number of freight items counted, a full load mass value indicative of the mass of the railway vehicle in a condition in which the maximum acceptable number of freight items is present and a tare mass value indicative of the mass of the railway vehicle in a condition in which no freight is present. The following formula may be used to determine the current load index of the railway vehicle:

$$\text{load index} = \frac{\text{number of freight items counted} * \text{average freight}}{\text{full load mass} - \text{tare mass}}$$

The maximum acceptable number of freight items may be understood as the number of freight items that may be accommodated inside the railway vehicle according to the appropriate regulations.

For example, freight may be understood as any transported item, for example inside a crate, or any packaging.

In a still further embodiment, the control means 104 may be arranged to count the number of passengers in the image acquired by the image acquisition means 102.

Once the number of passengers has been counted, the control means 104 may be arranged to determine the load index, on the basis of a predetermined maximum acceptable number of passengers inside the railway vehicle and the number of passengers counted in the image acquired by the image acquisition means 102. The following formula may be used to determine the current load index of the railway vehicle:

$$\text{load index} = \frac{\text{number of passengers counted}}{\text{acceptable number of passengers in the railway vehicle}}.$$

The maximum acceptable number of passengers may be understood as the number of people who may be accommodated inside the railway vehicle according to the appropriate regulations.

In a practical example, if the number of passengers counted is 10 and the maximum acceptable number of passengers is 13:

$$\text{load index} = \frac{10}{13} = 0.77.$$

In a further alternative embodiment in which a railway vehicle for freight transport and not for passenger transport is considered, the control means 104 may be arranged to count the number of freight items in the image acquired by the image acquisition means 102.

Once the number of freight items has been counted, the control means may determine the load index, on the basis of a predetermined maximum acceptable number of freight items inside the railway vehicle and the number of freight items counted in the image acquired by the image acquisition means 102. The following formula may be used to determine the current load index of the railway vehicle:

$$\text{load index} = \frac{\text{number of freight items counted}}{\text{acceptable number of freight items in the railway vehicle}}$$

The maximum acceptable number of freight items may be understood as the number of freight items that may be accommodated inside the railway vehicle according to the appropriate regulations.

For the embodiments wherein the control means 104 must count the number of passengers in the acquired image, the control means may be arranged to count the number of passengers in the image acquired by the image acquisition means 102 through an image recognition software based on artificial intelligence.

For embodiments wherein the control means 104 must count the number of freight items in the acquired image, the control means 104 may be arranged to count the number of freight items in the image acquired by the image acquisition means 102 through an image recognition software based on artificial intelligence.

In a still further embodiment, the control means 104 is arranged to count the number of seats occupied in the image acquired by the image acquisition means 102.

Once the number of seats occupied within the acquired image has been counted, the control means 104 may be arranged to determine the current load index of the vehicle as a function of a predetermined value of the average weight of a passenger, the number of occupied seats counted, a full load mass value indicative of the mass of the railway vehicle in a condition wherein there is the maximum acceptable number of passengers present and a tare mass value indicative of the mass of the railway vehicle in a condition wherein there are no passengers present. The following formula may be used to determine the current load index of the railway vehicle:

$$\text{load index} = \frac{\text{number of occupied seats counted} * \text{average}}{\text{full load mass} - \text{tare mass}}$$

In a practical example, if the number of occupied seats is 10, the average passenger weight is 70 kg, the full load mass is 1000 kg and the tare mass is 100 kg, the load index will be:

$$\text{load index} = \frac{10 * 70}{1000 - 100} = 0.78$$

In this embodiment, wherein the number of occupied seats must be counted, the control means 104 may be arranged to count the number of occupied seats in the image acquired by the image acquisition means 102 through an image recognition software based on artificial intelligence.

In an alternative embodiment, the control means 104 may be arranged to compare the image acquired by the image acquisition means 102 with a tare load image indicative of the inside of the railway vehicle wagon in a condition wherein there are no passengers or freight present.

Following the comparison, the control means 104 may be arranged to determine the current load index of the railway vehicle as a function of the percentage of area occupied by passengers or freight in the image acquired by the image acquisition means 102 relative to the tare load image.

For example, if it turns out that the area occupied by passengers in the acquired image is 80% of the tare load image, the current load index may be 0.8.

For example, if it turns out that the area occupied by freight in the acquired image is 80% of the tare load image, the current load index may be 0.8.

The following aspect applies to all the embodiments described above, in particular, the control means 104 may also be arranged to determine a mass value of the railway vehicle, as a function of the current determined load index, a full load mass value indicative of the mass of the railway vehicle in a condition wherein there is the maximum acceptable number of passengers or freight items in the railway vehicle and a tare mass value indicative of the mass of the railway vehicle in a condition wherein there are no passengers or freight present.

This vehicle mass may be calculated using the following formula:

Vehicle mass=Unladen mass+Load index*(Full mass−Unladen mass).

In a practical example, if the unladen mass is 100 kg, the full load mass is 1000 kg and the load index is 0.78, the vehicle mass will be:

Vehicle mass=100+0.78*(1000−100)=802

Therefore, the mass of the vehicle estimated from the acquired image is 802 kg.

Moreover, the control means 104 may be arranged to calculate a braking force to be applied through a braking means of the railway vehicle, as a function of the mass of the railway vehicle and of a target deceleration value to be achieved by the railway vehicle.

The braking force may be calculated using the following formula:

Braking force=Vehicle mass*target deceleration.

In a practical example, if the vehicle mass is 178 kg and the target deceleration is 10 m/s², the braking force will be:

$$\text{braking force} = 178 * 10 = 1780 \text{ kg} * \frac{m}{s^2} = 1780 \text{ N}$$

The advantage achieved is therefore that of having provided an advantageous solution in terms of energy, costs and accuracy that may be used to measure the mass of the vehicle even in the absence of pneumatic suspensions or as an alternative to known systems in trains equipped with pneumatic suspensions.

Various aspects and embodiments of a system for estimating a load index of a railway vehicle according to the invention have been described. It is understood that each embodiment may be combined with any other embodiment. Furthermore, the invention is not limited to the described embodiments, but may be varied within the scope defined by the appended claims.

The invention claimed is:

1. A system for estimating a load index of a railway vehicle, comprising:
    an image acquisition means arranged to acquire in real time an image of a predetermined area inside a wagon of said railway vehicle; and
    a control means arranged to determine an actual value of the load index of the railway vehicle as a function of said image acquired by the image acquisition means, wherein said control means is arranged for:
        comparing the image acquired by the image acquisition means with a plurality of predefined sample images; each sample image being assigned a predetermined load index of the railway vehicle;
        determining which sample image has the greatest degree of similarity with the image acquired by the image acquisition mean; and
        determining that the current load index of the railway vehicle corresponds with the predetermined load index assigned to the sample image determined to have the greatest degree of similarity with the image acquired by the image acquisition means.

2. The system according to claim 1, wherein the control unit is arranged to determine which sample image has the greatest degree of similarity with the image acquired by the image acquisition means through an image recognition software based on artificial intelligence, wherein the degree of similarity is based on one or more evaluation parameters comprising a chromatic evaluation parameter, a shape parameter, or a brightness parameter.

3. The system according to claim 1, wherein said control means is arranged for:
    counting the number of passengers within the image acquired by the image acquisition means;
    determining the actual value of the current load index of the railway vehicle, based on a predetermined average passenger weight value, the counted number of passengers, a full load mass value indicative of the mass of the railway vehicle in a condition in which the maximum acceptable number of passengers is present in the railway vehicle and a tare mass value indicative of the mass of the railway vehicle in a condition in which there are no passengers in the railway vehicle, through the following formula:

$$\text{Load index} = \frac{\text{number of passengers counted} * \text{average passenger weight value}}{\text{full load mass} - \text{tare mass}}.$$

4. The system according to claim 3, wherein the control means is arranged to count the number of passengers in the image acquired by the image acquisition means through an image recognition software based on artificial intelligence.

5. The system according to claim 3, wherein the control means is further arranged to determine an actual value of a railway vehicle mass value, according to the current determined actual value of the load index, a full load mass value indicative of the mass of the railway vehicle in a condition in which the maximum acceptable number of passengers or freight items is present in the railway vehicle and a tare mass value indicative of the mass of the railway vehicle in a condition in which there are no passengers or freight items in the railway vehicle, through the following formula:

$$\text{Actual value of the railway vehicle mass} = \text{tare mass} + \text{determined actual value of the load index} * (\text{full load mass-tare mass}).$$

6. The system according to claim 5, wherein the control means is further arranged to calculate a braking force to be applied through a braking means of the railway vehicle, as a function of the determined actual value of the railway vehicle mass and of an objective deceleration value that the railway vehicle has to reach, through the following formula:

$$\text{Braking force} = \text{determined actual value of the railway vehicle mass} * \text{objective deceleration}.$$

7. The system according to claim 1, wherein said control means is arranged for:
    counting the number of freight items within the image acquired by the image acquisition means;
    determining the actual value of the current load index of the railway vehicle, based on a predetermined average freight item weight value, the counted number of freight items, a full load mass value indicative of the mass of the railway vehicle in a condition in which the maximum acceptable number of freight items is present in the railway vehicle and a tare mass value indicative of the mass of the railway vehicle in a condition in which there are no freight items in the railway vehicle, through the following formula:

$$\text{load index} = \frac{\text{counted number of freight items} * \text{average freight item weight}}{\text{full load mass} - \text{tare mass}}.$$

8. The system according to claim 1, wherein said control means is arranged for:
    counting the number of occupied seats in the image acquired by the image acquisition means;
    determining the actual value of the current load index of the railway vehicle, based on a predetermined average passenger weight value, the counted number of occupied seats, a full load mass value indicative of the mass of the railway vehicle in a condition in which the maximum acceptable number of passengers is present in the railway vehicle and a tare mass value indicative of the mass of the railway vehicle in a condition in which there are no passengers in the railway vehicle, through the following formula:

$$\text{Load index} = \frac{\text{counted number of occupied seats} * \text{average passenger weight}}{\text{full load mass} - \text{tare mass}}.$$

9. The system according to claim 8, wherein the control means is arranged to count the number of occupied seats in the image acquired by the image acquisition means through an image recognition software based on artificial intelligence.

10. The system according to claim 1, wherein said control means is arranged for:
counting the number of occupied seats in the image acquired by the image acquisition means;
determining the actual value of the current load index of the railway vehicle, based on the counted number of occupied seats and the total number of seats of the railway vehicle, using the following formula:

$$\text{Load index} = \frac{\text{counted number of occupied seats}}{\text{total number of seats}}.$$

11. The system according to claim 1, wherein said control means is arranged for:
comparing the image acquired by the image acquisition means with a tare load image indicative of the interior of a wagon of the railway vehicle in a condition in which there are no passengers or freight items inside the wagon;
determining the actual value of the current load index of the railway vehicle as a function of the percentage of area occupied by passengers or freight items in the image acquired by the image acquisition means with respect to the tare load image.

12. A system for estimating a load index of a railway vehicle, comprising:
an image acquisition means arranged to acquire in real time an image of a predetermined area inside a wagon of said railway vehicle; and
a control means arranged to determine an actual value of the load index of the railway vehicle as a function of said image acquired by the image acquisition means, wherein said control means is arranged for:
counting the number of passengers in the image acquired by the image acquisition means;
determining the actual value of the load index, on the basis of a predetermined maximum acceptable number of passengers within the railway vehicle and the counted number of passengers in the image acquired by the image acquisition means, through the following formula:

$$\text{Load index} = \frac{\text{counted number of passengers}}{\text{maximum number of passengers acceptable in the railway vehicle}}.$$

13. The system according to claim 12, wherein the control means is arranged to count the number of freight items in the image acquired by the image acquisition means through an image recognition software based on artificial intelligence.

14. A system for estimating a load index of a railway vehicle, comprising:
an image acquisition means arranged to acquire in real time an image of a predetermined area inside a wagon of said railway vehicle; and
a control means arranged to determine an actual value of the load index of the railway vehicle as a function of said image acquired by the image acquisition means, wherein said control means is arranged for:
counting the number of freight items in the image acquired by the image acquisition means;
determining the actual value of the load index, on the basis of a predetermined maximum acceptable number of freight items within the railway vehicle and the counted number of freight items in the image acquired by the image acquisition means, through the following formula:

$$\text{Load index} = \frac{\text{counted number of freight items}}{\text{maximum number of freight items acceptable in the railway vehicle}}.$$

* * * * *